United States Patent [19]
Novi

[11] 4,159,017
[45] Jun. 26, 1979

[54] SOLAR PANEL SYSTEM

[76] Inventor: Sam Novi, 1686 Great Hwy., San Francisco, Calif. 94116

[21] Appl. No.: 869,432

[22] Filed: Jan. 16, 1978

[51] Int. Cl.² .............................................. F24J 3/02
[52] U.S. Cl. ................................... 126/271; 237/1 A; 165/171
[58] Field of Search .............. 126/270, 271; 237/1 A; 165/171, 133, 168–170

[56] References Cited

U.S. PATENT DOCUMENTS

| | | | |
|---|---|---|---|
| 1,837,449 | 12/1931 | Kunz | 126/271 |
| 2,998,006 | 8/1961 | Johnston | 126/271 |
| 3,299,881 | 1/1967 | Koch | 126/271 |
| 3,958,755 | 5/1976 | Cleer, Jr. | 126/271 |
| 3,974,822 | 8/1976 | Patil | 126/271 |
| 3,996,919 | 12/1976 | Heep | 126/271 |
| 4,013,062 | 3/1977 | Laird | 126/271 |

*Primary Examiner*—William F. O'Dea
*Assistant Examiner*—Larry Jones
*Attorney, Agent, or Firm*—Julian Caplan

[57] ABSTRACT

A solar heating panel has a rectangular frame to receive a rectangular metal pan which supports a continuous coil of water tubing which is attached thereto by strips of metal attached to the pan. Preferably, the frame is divided into quadrants by rails. Each quadrant is closed off by a pane of glass cushioned and weather-stripped to the frame and rails. Above the glass is a continuous sheet of a synthetic, highly transparent plastic which is attached to the frame by a gasket. Provision is made for thermal expansion of the various components, for drainage, for prevention of leakage of moisture and for insulation. The panel can be incorporated in a household water heating system and also to heat space. The metal pan has a roughened surface (e.g., pebbled, diamond-embossed) and is painted black. This structure increases the area exposed to the sun, eliminates reflection, interrupts flow of cooling air across the surface of the pan, and reduces the effect of expansion and contraction.

6 Claims, 11 Drawing Figures

U.S. Patent  Jun. 26, 1979  Sheet 1 of 2  4,159,017
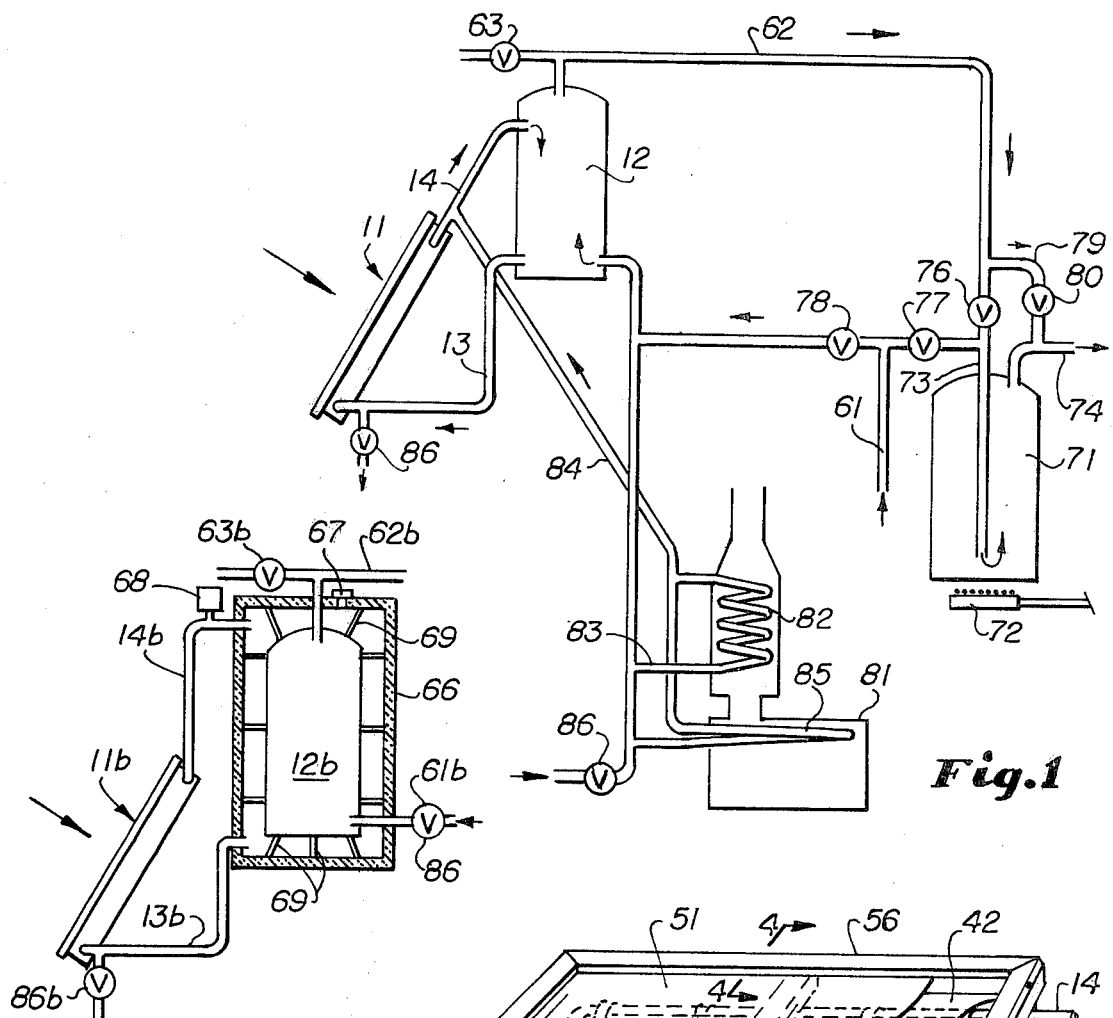
Fig.1
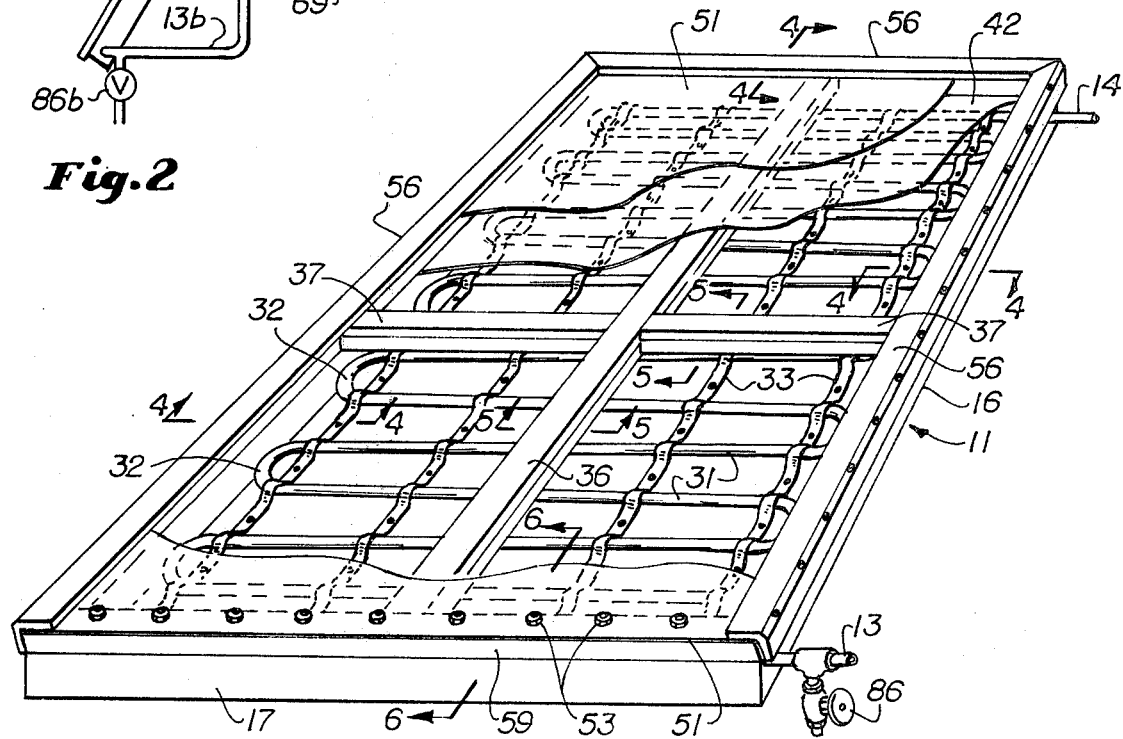
Fig.2
Fig.3

SOLAR PANEL SYSTEM

This invention relates to a new and improved solar panel system. There are a number of solar panels in use throughout the world employing solar radiation to heat water and air for household and industrial use. The present invention is an improvement on such solar panels, having high thermal efficiency so that the water is heated rapidly to a high temperature. In fact, in reasonably bright sunshine even in high latitudes and altitudes steam can be produced with the panels of the present invention regardless of ambient air temperature.

One of the features of the invention is the provision of insulation which reduces heat loss either through the back of the panel or out the side.

Further, the device employs a pan of black metal which has a pebbled, diamond-embossed or other irregular surface to expose more area to the sun's rays at all times of the year and hours of the day.

Within the panel is the pan aforementioned on which lies a continuous coil made up of stretches which are approximately horizontal but slope slightly upward and U-shaped ends returning to adjacent stretches. The coil is preferably of copper tubing. Spaced above the coil is a pane of single strength glass, and spaced above the glass is a sheet of clear synthetic plastic. Thus the pan and coil has access to radiant heat from the sun but is insulated from the exterior against conduction and convection losses.

A further feature of the invention is the fact that it is constructed in such fashion as to be extremely durable, providing protection against rotting or leakage. The collector panel under test functions as a thermo-siphon system supplying water for a long period of time without maintenance problems.

An advantage of the invention is that the panel is of simple construction so that it can be mass produced or individually produced at reasonable cost with readily available durable materials lending themselves to easy assembly and installation by unskilled labor. The panels are of less weight than prior panels as well as being more heat efficient.

Because the stretches of the coil are almost horizontal, no enlarged holes in the frame for the inlet and outlet pipes are required, thereby differing from prior solar panel constructions.

In cold climates a non-freezing liquid may be used in the solar panel and the liquid is used in a heat exchanger to heat water. However, no pump is required to circulate the liquid because the panel functions as a thermo-siphon.

Without the tubing, the panel may be used to heat air.

Other objects of the present invention will become apparent upon reading the following specification and referring to the accompanying drawings in which similar characters of reference represent corresponding parts in each of the several views.

In the drawings:

FIG. 1 is a schematic view showing a panel installed in a system which comprises a panel tank, a conventional hot water tank, and a stove having a coil in the stack.

FIG. 2 is a fragmentary view of a modification of a portion of FIG. 1.

FIG. 3 is an enlarged perspective view of a panel constructed in accordance with this invention.

Figure 4:
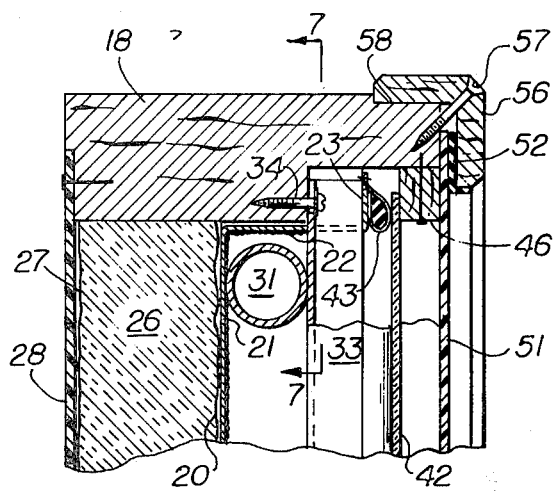
Figure 5:
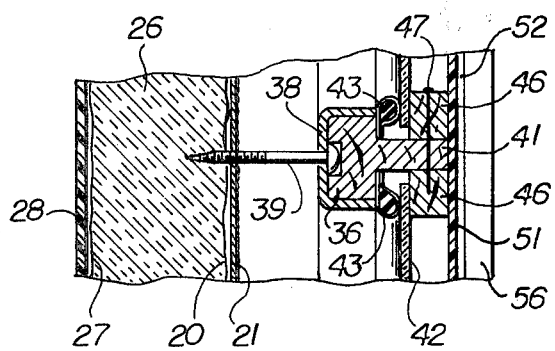
Figure 6:
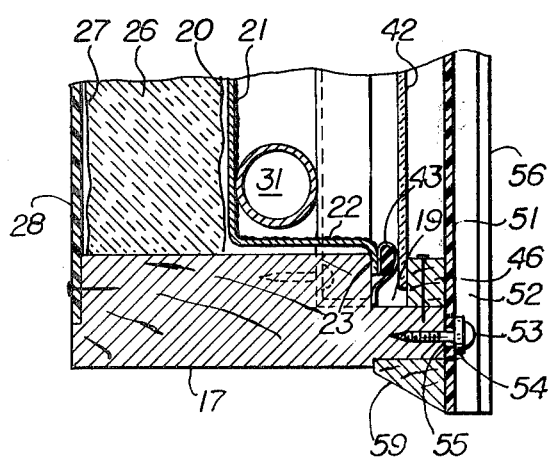

FIGS. 4, 5 and 6 are enlarged fragmentary sectional views taken substantially along the lines 4—4, 5—5 and 6—6, respectively, of FIG. 3.

Figure 7:
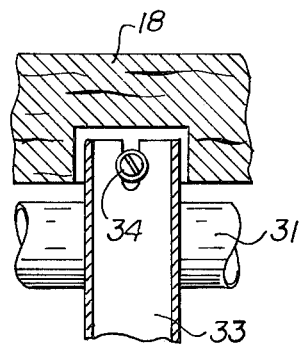

FIG. 7 is a sectional view taken substantially along the line 7—7 of FIG. 4.

Figure 8:
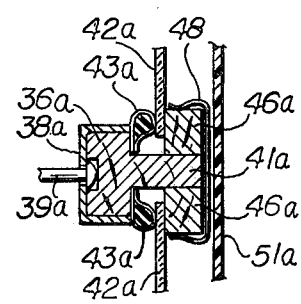

FIG. 8 is a fragmentary sectional view showing a modification of a portion of the structure shown in FIG. 5.

Figure 9:
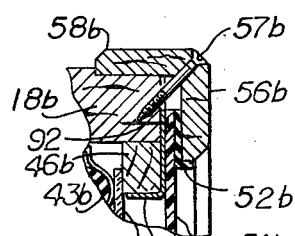

FIG. 9 is a fragmentary sectional view showing another modification of the structure of FIG. 4.

Figures 10, 11:
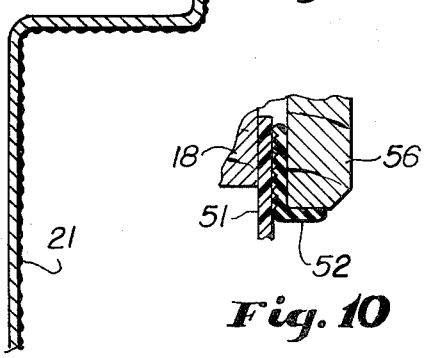

FIG. 10 is an enlarged, fragmentary sectional view of a portion of FIG. 4 showing details of a gasket sealing the outer cover to the frame.

FIG. 11 is an enlarged, fragmentary sectional view showing the irregular surface of the metal pan.

The present invention employs a solar panel 11 connected to a solar panel water tank 12 by inlet and outlet pipes 13, 14, respectively.

Panel 11 is mounted in a frame consisting of side, bottom and top frame members 16, 17, 18, respectively, preferably made of wood, such as redwood or cedar. The top inward facing edge of each of the members 16, 17, 18 is formed with a rabbet 19. Fitting within the frame member is a rectangular pan 21 having four sides 22 each having an outward extending peripheral flange 23 which fits on the bottom of the rabbet 19. Pan 21 is preferably formed of aluminum or copper embossed with a diamond or other shape, as pebbled. The aluminum is protected by an undercoat of red lead and a finish coat of flat black paint.

Beneath pan 21 is a layer of aluminum foil 20 and glass wool fibre or rock wool or other heat insulating means 26 supported by a bottom 28 of plywood or composition board, the edges of which are recessed into the frame members 16, 17, 18. A layer of plastic sheeting 27 is laid over the bottom 29 to keep out moist air.

Supported on the pan 21 is a coil of continuous copper tubing consisting of almost horizontal stretches 31 which are U-shaped bends 32 having a radius of curvature of about 3-½ inches. The stretches 31 all slope slightly upward, for example, at a pitch of about 3/16 inch to the foot, to promote drainage and eliminate steam pockets. The lowermost stretch 31 is an extension of inlet 13 and the uppermost is an extension of outlet 14 which extends out through the sides of the frame. To hold the tubing 31 secured to the panel, narrow strips 33 of aluminum extend vertically and are secured to pan 21 at intervals by screws 34.

Spaced above the tubing 31 is a vertical rail 36 which runs from top to bottom of the frame and midway of the length of vertical rail 36 and extending laterally are horizontal rails 34. Rails 34 or 36 are received in metal channels 38 which are spaced above the pan 21 by means of screws 39 fitting into grooves 40 in rail 36. Each member 36 or 37 has an upward extending leg 41 having a top elevation about equal to that of the rails 16, 17, 18. Four glass panels 42 fit between the sides and the rails and are thermally insulated and cushioned by means of weather-stripping 43 interposed between the panels 42 and the flanges 22. Weatherstripping 43 preferably consists of a foam artificial rubber core and a skin surrounding the foam. Directing attention to FIG. 5, the weather-stripping 43 seals the pane 42 to the rail 36. It will be further noted that to provide for thermal expansion of the glass 42 the edges are spaced from the frame members and rails.

Above glass 42 are wooden spacers 46. At the tops, bottoms and sides the spacers 46 are secured to the frame members 16, 17 and 18. Spacers 46, as shown in FIG. 5, may also be nailed to leg 41 of rail 36. FIG. 8 shows an alternate construction wherein the spacers 46a are secured to leg 41a by clip 48. In other respects, the modification of FIG. 8 resembles that of FIG. 5, and the same reference numerals followed by subscript a are used to designate corresponding parts.

Above spacers 46 is a single sheet of artificial plastic material 51. The top and side edges of panel 51 rest on the top edge of the frame members 16, 18. As shown in FIG. 6, the bottom edge of panel 51 extends down below bottom frame member 17 and is fastened thereto by screws 53 and washers 54. Screws 53 fit through oversize holes 55 in panel 51 to accommodate expansion and contraction. The top and side edges of panel 51 are free for expansion. A triangular support 59 protects the bottom edge of panel 51, the latter being nailed to bottom frame member 17. A circumferential rubber gasket 52 seals the plastic panel 51 to the side, bottom and top frame members 16, 17 and 18. Gasket 52 preferably has a sealing lip 49 and the back of the gasket is corrugated to improve the seal against moisture.

Returning now to the system shown in FIG. 1, cold water supply 61 is connected to the bottom of tank 12 and a hot water outlet line 62 is connected to the top of tank 12. A safety relief valve 63 is provided. A thermo-syphon is set up between the panel 11 and tank 12. As water is heated in the panel 11, it rises and flows through outlet 14 to the tank 12, displacing water which enters the panel 11 through the pipe 13. Circulation continues until the water in tank 12 reaches an elevated temperature which may be as high as 212° F. under certain circumstances. If steam forms in the tank 12, the relief valve 63 opens automatically. Hot water may be drawn off through pipe 62 for household or industrial use.

In the specific system shown in FIG. 1, a hot water tank 71 of conventional type is used having a gas burner 72 or other heating means which is thermostat controlled. Inlet 73 of tank 71 may be connected to cold water supply 61 or it may be connected to the tank 62. The hot water is drawn off from tank 71 by line 74, leading to faucets in a household. As illustrated, three valves 76, 77, 78 may be installed. Valve 77 controls the supply of cold water to tank 71 when the solar panel is not in use and when heater 72 is in use. When the valve 77 is open, the valves 76 and 78 are always closed. When the solar panel 11 is in use, however, valve 77 is closed and both valves 76 and 78 are open. Water then circulates from the cold water supply through the thermo-syphon and into the tank 71 through pipe 62. If additional heat is needed, the burner 72, preferably thermostat-controlled in conventional manner, will come on to elevate the temperature of the water before it is drawn off through line 74. By-pass 79 containing open valve 80 may be used to by-pass tank 71. When valve 80 is open and valve 76 is open and valve 77 closed, tanks 12 and 71 are in series.

As a further economy in heat, a stove or furnace 81 may be furnished with a coil 82 in its stack. The inlet line 83 of coil 82 is connected to the inlet of tank 12 and the outlet 84 of the coil 82 is connected to the outlet 14 of panel 11. To supplement or replace coil 82, a coil 85 may be installed in the stove itself to use the heat of the stove. Coil 85 is connected in parallel with coil 82, as shown in FIG. 1.

To drain the system, drain cocks 86 are installed at various locations including line 13, the bottom of coil 82 or 85, etc.

Directing attention to FIG. 2, in freezing climates, instead of water, a non-freezing liquid circulates through panel 11b, and panel 11b is connected to heat exchange tank 66 by inlet 13b and outlet 14b. Fluid may be added to tank 66 through plug 67. A pressure relief valve 68, preferably spring or weight actuated, allows the volume of the fluid system to expand or contract. Water tank 12b is supported within heat exchange tank 66 by supports 69. Tank 12b is connected into the water system of FIG. 2 in the same manner as tank 12 of FIG. 1. The same reference numerals followed by subscript b are used in FIG. 2 to designate corresponding elements of FIG. 1.

What is claimed is:

1. A solar collecting panel comprising a frame, said frame having sides, ends and a back, an elongated multi-curved tubular coil within said frame and having an inlet and an outlet extending exteriorly of said frame, a solar collecting pan attached to said frame behind said coil, securing means holding said coil in position relative to said pan, a first transparent panel over said coil, first sealing means sealing said first panel to said frame, a second transparent panel spaced above said first panel, and second sealing means attaching said second panel to said frame, said pan having a bottom parallel to and spaced from said back and having upstanding sides fixed to said frame, said first sealing means hermetically sealing said first panel to said pan, one end of said second panel extending outward beyond one end of said frame and said second panel being freely supported to expand and contract in two transverse directions parallel to said back, said second panel being of a plastic material, said first panel being formed of a plurality of panes, and at least one longitudinal and one transverse rail extending between ends and sides of said frame, respectively, and fixed thereto spaced above said pan, said rail comprises a channel, a means in said channel extending between said panes and abutting the underside of said second panel, and means spacing said channel from said pan, said first sealing means weather-stripping and cushioning said panes and said rails and permitting free expansion and contraction of said panes in two transverse directions parallel to said back, said second panel being sealed relative to said frame for weather and thermal air circulation, the space between said panes and said second panel being a dead air space.

2. A panel according to claim 1 in which said pan is black and has a rough surface formed of shallow embossed diamond shapes or pebbled.

3. A solar panel according to claim 1 which further comprises a plurality of parallel longitudinal strips over said coil and fastening means fastening said strips to said pan to secure said coil relative to said pan, said strips being black and having a rough surface.

4. A solar panel according to claim 1 in which said first panel is of window glass.

5. A solar panel according to claim 1 in which said solar panel is slanted and facing the sun which further comprises a first tank in proximity to said solar panel, said inlet leading from the bottom of said first tank and said outlet discharging into the top of said first tank, a hot water heater having a second tank and water heating means, a first pipe leading from a source of water to said first tank, a second pipe leading from the top of said first tank to said second tank, valve means to connect or disconnect said tanks from communication with each other, a fuel-burning heater including a stack, a second coil in said heater, a third pipe connecting the top of said second coil with said first tank, and a fourth pipe connecting the bottom of said second coil with said second pipe.

6. A solar panel according to claim 1 which further comprises a heat exchange tank in proximity to said solar panel, said inlet leading to the bottom of said heat exchange tank and said outlet discharging into the top of said heat exchange tank, a water tank supported inside said heat exchange tank, and means for circulating water through said water tank, the sole means of circulating fluid between said heat exchange tank and said solar panel being the thermo-siphon effect of said solar panel.

* * * * *